(12) United States Patent  
Witte et al.

(10) Patent No.: US 10,167,583 B2  
(45) Date of Patent: Jan. 1, 2019

(54) HONEYCOMB STRUCTURE MADE OF A NON-WOVEN MADE OF RECYCLED CARBON FIBERS

(71) Applicant: Airbus Operations GmbH, Hamburg (DE)

(72) Inventors: Tassilo Witte, Stade (DE); Georg Lonsdorfer, Stade (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 325 days.

(21) Appl. No.: 14/852,926

(22) Filed: Sep. 14, 2015

(65) Prior Publication Data

US 2016/0076179 A1 Mar. 17, 2016

(30) Foreign Application Priority Data

Sep. 12, 2014 (DE) .................. 10 2014 013 532

(51) Int. Cl.

| | |
|---|---|
| *D04H 1/4242* | (2012.01) |
| *B32B 15/14* | (2006.01) |
| *B29D 24/00* | (2006.01) |
| *B29D 99/00* | (2010.01) |
| *B32B 37/12* | (2006.01) |
| *B32B 5/02* | (2006.01) |
| *B32B 5/22* | (2006.01) |
| *B32B 5/26* | (2006.01) |
| *B32B 3/12* | (2006.01) |
| *B32B 7/12* | (2006.01) |
| *B32B 37/14* | (2006.01) |

(52) U.S. Cl.  
CPC ......... *D04H 1/4242* (2013.01); *B29D 24/005* (2013.01); *B29D 99/0089* (2013.01); *B32B 5/02* (2013.01); *B32B 5/022* (2013.01); *B32B 5/22* (2013.01); *B32B 5/26* (2013.01); *B32B 15/14* (2013.01); *B32B 37/1292* (2013.01); *B32B 3/12* (2013.01); *B32B 7/12* (2013.01); *B32B 37/146* (2013.01); *B32B 2260/021* (2013.01); *B32B 2260/046* (2013.01); *B32B 2262/106* (2013.01); *B32B 2305/024* (2013.01); *B32B 2305/72* (2013.01); *B32B 2307/50* (2013.01); *B32B 2605/18* (2013.01)

(58) Field of Classification Search  
None  
See application file for complete search history.

(56) References Cited

U.S. PATENT DOCUMENTS

| | | | |
|---|---|---|---|
| 4,647,326 A | 3/1987 | Pott | |
| 5,006,391 A * | 4/1991 | Biersach | ............... B32B 3/12 428/116 |

(Continued)

FOREIGN PATENT DOCUMENTS

| | | |
|---|---|---|
| EP | 0113841 | 7/1984 |
| EP | 1515835 | 3/2005 |
| WO | 2013144844 | 10/2013 |

OTHER PUBLICATIONS

German Search Report, dated May 8, 2015.

*Primary Examiner* — Adam Krupicka  
(74) *Attorney, Agent, or Firm* — Greer, Burns & Crain, Ltd.

(57) ABSTRACT

A honeycomb structure comprising carbon-fiber non-woven, sandwich structure comprising the honeycomb structure, and process for the production of the honeycomb structure.

11 Claims, 6 Drawing Sheets

(56) References Cited

U.S. PATENT DOCUMENTS

| | | | |
|---|---|---|---|
| 5,730,920 A * | 3/1998 | Marshall | B32B 3/12 264/214 |
| 6,117,518 A * | 9/2000 | Cawse | B32B 3/12 428/116 |
| 2005/0249914 A1 | 11/2005 | Scheibel et al. | |
| 2009/0283635 A1* | 11/2009 | Gerken | B32B 3/12 428/116 |
| 2010/0047515 A1 | 2/2010 | Kehrle et al. | |
| 2011/0281063 A1* | 11/2011 | Levit | B32B 3/12 428/116 |
| 2015/0044438 A1* | 2/2015 | Baser | D04H 1/485 428/212 |
| 2015/0292145 A1* | 10/2015 | Sonoda | D04H 1/4242 442/60 |

* cited by examiner

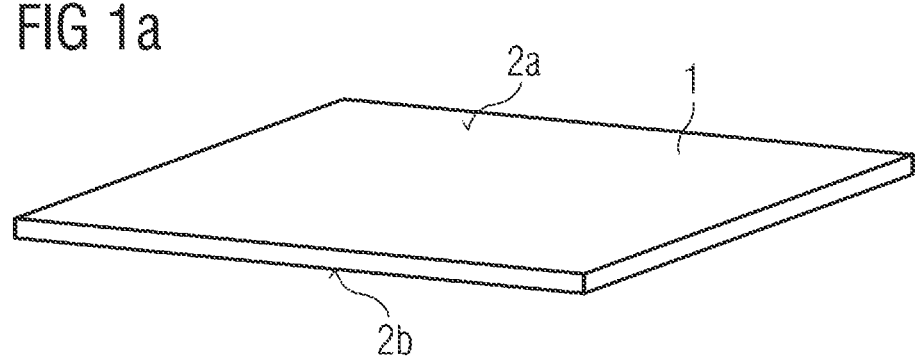
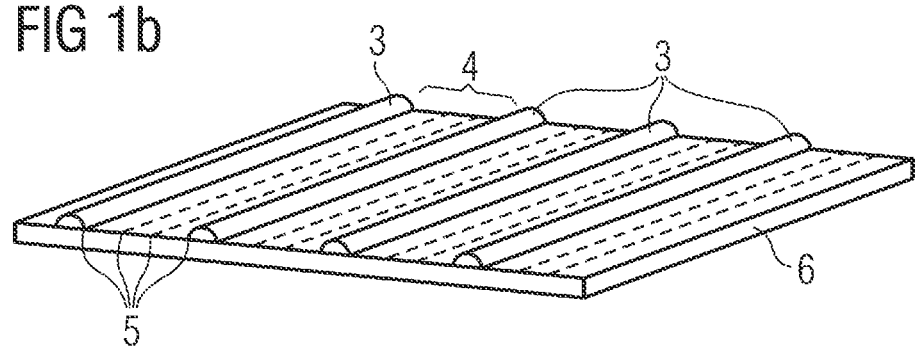
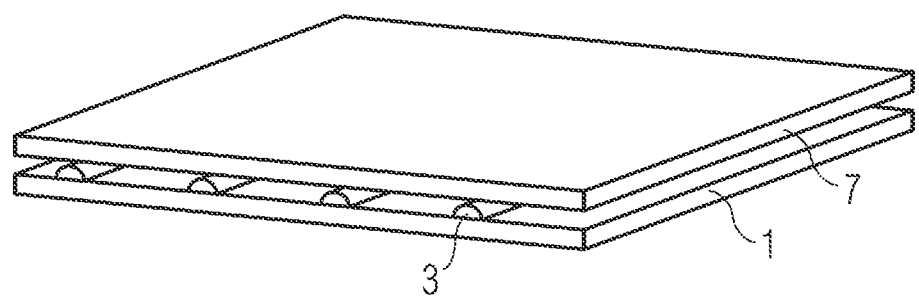

HONEYCOMB STRUCTURE MADE OF A NON-WOVEN MADE OF RECYCLED CARBON FIBERS

CROSS-REFERENCES TO RELATED APPLICATIONS

This application claims the benefit of the German patent application No. 102014013532.2 filed on Sep. 12, 2014, the entire disclosures of which are incorporated herein by way of reference.

BACKGROUND OF THE INVENTION

The invention relates to a honeycomb structure made of a non-woven which can be produced from recycled carbon fibers.

Carbon fibers are used in a wide variety of products, for example in sports equipment and vehicles, and in products which can exhibit usefulness and artistic design. They are mostly used after embedding within a plastics matrix, the term used here being carbon-fiber-reinforced plastics, abbreviated to CFRP.

In view of increasing use of carbon fibers in consumer products, and also in vehicles, recycling of wastes comprising carbon fibers is an increasingly important challenge. It is not usually possible to apply molding processes to used parts made of CFRP, because the matrices surrounding the carbon fibers are mostly thermosets.

Carbon non-woven is used to dissipate static charges and to provide electrical conductivity. It is composed of short carbon filaments randomly mutually superposed under pressure, and is by way of example obtainable in the form of rolls of width 1 m.

Carbon-fiber non-wovens made of recycled carbon fibers are by way of example known from the document WO 2013/144844 A1.

Honeycomb structures are known as core material for sandwich structures. They are used in a wide variety of applications, for example in surfboards and spacecraft. The document EP 1515835 B1 thus describes a process for the production of a carbon honeycomb body by using a resin-impregnated honeycomb base structure made of paper or non-woven. The paper or nonwoven here is first pyrolysed and compacted/stabilized; the stabilized honeycomb is coated with a carbon-containing solution, and then again pyrolysed.

The document EP 0113841 B1 relates to a process for the production of a molding made of composite material by applying synthetic-resin-impregnated laminate layers onto a male mold, where, during the build-up of the layers, a multiple/double layer composed of two or more cellular core layers or honeycomb layers is introduced into the neutral zone of the aforementioned layers, and the multiple or double layer is produced as unit and is inserted as unit between the laminate layers, where a self-supporting, load-bearing bonding layer made of woven glass fabric, carbon-fiber non-woven, polyamide or the like, or of synthetic-resin-impregnated non-woven or woven fabric is arranged between each two cellular core layers or honeycomb layers.

Resin-impregnated papers made of aromatic polyamides have moreover been disclosed, as also have production processes for honeycomb cores, and honeycomb cores made of woven CFRP fabrics of the type that can by way of example be produced manually for spacecraft.

However, the prior art comprised no relatively low-cost sandwich-core structures which take the form of honeycombs and permit effective introduction of tangential shear forces from the outer layers via the honeycomb structure into the respective opposite outer layer.

SUMMARY OF THE INVENTION

A honeycomb structure comprising carbon-fiber non-woven eliminates the disadvantages of the prior art; this is surprising and was not foreseeable by the person skilled in the art. The carbon-fiber non-woven is composed of short carbon fibers randomly mutually superposed under pressure. The orientations of the fibers are in all directions within the plane of the non-woven. There are therefore always fibers oriented in such a way that they lie in the direction of the incident forces. A honeycomb structure must absorb not only forces parallel to the honeycomb tubes for the support of outer layers, but also force components which act in other directions, allowing transmission of force to the respective other outer layer when forces acting tangentially on an outer layer are introduced. This is not possible when woven CFRP fabrics are used, since the fibers in woven fabrics are predominantly oriented at right angles to one another. It is preferable that the honeycomb structure is predominantly, i.e., to an extent of more than half, based on the weight of the honeycomb structure without resin, composed of carbon-fiber non-woven. The transmission of force in a plurality of directions as described above can thus be achieved to a particular extent via the carbon fibers. It is further preferable that the carbon-fiber non-woven comprises reclaimed, i.e., recycled carbon fibers.

These reclaimed, i.e., recycled carbon fibers would otherwise have to be sent expensively for disposal and would be lost from the system for recycling of useful materials, and moreover new fibers would have to be provided at relatively high cost. The length of the carbon fibers, often reduced in comparison with new fibers, is advantageous for the application described here. It is further preferable that the length of the fibers of the carbon-fiber non-woven is from 4 to 60 mm, particularly from 6 to 50 mm, very particularly from 12 to 25 mm. It is further preferable that the fibers of the carbon-fiber non-woven are predominantly unoriented, i.e., do not have the type of specific orientation found in a unidirectional or multiaxial laid fiber scrim. It is particularly preferable that the fibers of the carbon-fiber non-woven have random orientation, i.e., orientation to an equal extent in all directions within the plane of the non-woven. It is further preferable that the honeycomb structure has been impregnated with synthetic resin.

Synthetic resins are liquids which are capable of forming macromolecules, for example polyester resins, in-situ-polymerization resins or epoxy resins. Suitable synthetic resins are epoxy resins, phenolic resins, benzoxazine resins and polyester resins, preferably phenolic resins. It is further preferable that the honeycomb structure additionally comprises fire-retardant additives. Fire-retardant additives can be flame retardants or other agents which retard burning of the honeycomb structure beyond the normal extent thereof. Examples of suitable fire-retardant additives are halogenated flame retardants such as tetrabromobisphenol A (TBBPA) and inorganic flame retardants such as ammonium sulphate, magnesium hydroxide, antimony pentoxide, antimony trioxide, aluminum hydroxide and aluminum trihydrate, preferably aluminum hydroxide (Al(OH)3). It is further preferable that the honeycomb structure additionally comprises unidirectional fibers; it is particularly preferable that the orientation of the unidirectional fibers is perpendicular to edges or sharp bends of the honeycombs. It is thus possible to assist the expansion of the precursor to give the actual honeycomb structure when the tensile strength of the nonwoven is inadequate during the expansion process. Without these unidirectional fibers oriented perpendicularly to edges or sharp bends of the subsequent honeycombs it can be more difficult to achieve the desired shape of the honeycombs. It is further preferable here that the ratio by mass of carbon-fiber non-woven to unidirectional fibers is greater than 10:1, particularly greater than 20:1.

The invention also encompasses a sandwich structure comprising a honeycomb structure of the invention. A honeycomb structure of the invention is arranged here as core between outer layers. It is further preferable here that a sandwich structure of the invention comprises two substantially parallel-arranged outer layers, between which the honeycomb structure is arranged in such a way that the walls of the honeycomb structure are arranged so as to be substantially orthogonal to the outer layers. It is further preferable here that the outer layers of a sandwich structure of the invention are composed of GRP (Glass fiber Reinforced Plastic), CFRP and/or metal. The outer layers are advantageously composed of prepreg material, i.e., fibers impregnated with unhardened resin, or laid scrims made thereof. The bonding can be achieved by using a press or in an autoclave, with resultant frictional bonding between outer layers and honeycomb. It is also possible to use outer layers made of non-woven or metal.

The invention also comprises a process for the production of honeycomb structures made of carbon-fiber non-woven, characterized by the following steps: a) provision of a first layer of carbon-fiber non-woven, b) application of a plurality of first, parallel-arranged beads of adhesive substantially with regular separations on the first layer of carbon-fiber non-woven, where the first, parallel-arranged beads of adhesive cover one quarter of the upper-side area of the first layer of carbon-fiber non-woven, c) placing of a second layer of carbon-fiber non-woven onto the first layer of carbon-fiber non-woven, d) application of a plurality of further, parallel-arranged beads of adhesive with substantially regular separations onto the upper-side area of the uppermost layer of carbon-fiber non-woven, where the further, parallel-arranged beads of adhesive, after consolidation of these, cover from one tenth to one quarter, particularly preferably from one sixth to one eighth, of the area of the further layer of carbon-fiber non-woven and are arranged parallel, and also centrally offset with respect to the aforementioned between the beads of adhesive located under the uppermost layer of carbon-fiber non-woven, e) placing of a further layer of carbon-fiber non-woven onto the material, f) repetition of the steps d) and e) two or more times, g) curing of the beads of adhesive, h) expansion of the layers of carbon-fiber non-woven via exertion of a tensile force directed so as to be orthogonal to the layers of carbon-fiber non-woven and acting on the first and the final layer of carbon-fiber non-woven, i) impregnation of the expanded honeycomb structure with resin, j) curing of the resin.

The expression "bead of adhesive" means adhesive in an elongate form which can be obtained via application of the adhesive in liquid form, an example being a joint sealant applied by a pressure system (e.g., products with the trademark Sikaflex). These beads of adhesive can also be applied in solid form, e.g., provided between release paper. Consolidation of the beads of adhesive represents a solidification step which can comprise procedures such as drying, partial hardening or curing of the beads of adhesive.

The impregnation of the expanded honeycomb structure with resin can take place in an immersion bath. It is preferable that the honeycomb structure is impregnated in a block. The curing of the impregnation resin takes place at room temperature or in an oven or autoclave above room temperature.

It is preferable here that the steps a) to h), and also j), are carried out in their alphabetical sequence. It is particularly preferable here that the steps a) to j) are carried out in their alphabetical sequence.

The honeycomb structure impregnated in a block can be cut to size to give honeycomb sheets, for example by sawing.

BRIEF DESCRIPTION OF THE DRAWINGS

FIG. 1a shows a layer of nonwoven.
FIG. 1b shows beads of adhesive applied to the layer of nonwoven of FIG. 1a.
FIG. 1c shows a second layer of nonwoven applied to the beads of adhesive of FIG. 1b.

DETAILED DESCRIPTION OF THE PREFERRED EMBODIMENTS

Figure 1D:
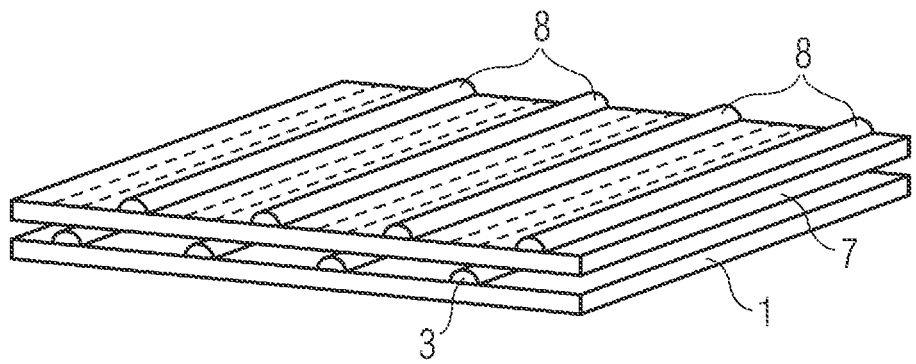
FIG. 1d shows a second application of adhesive beads on the second layer of nonwoven of FIG. 1c.
Figure 1E:
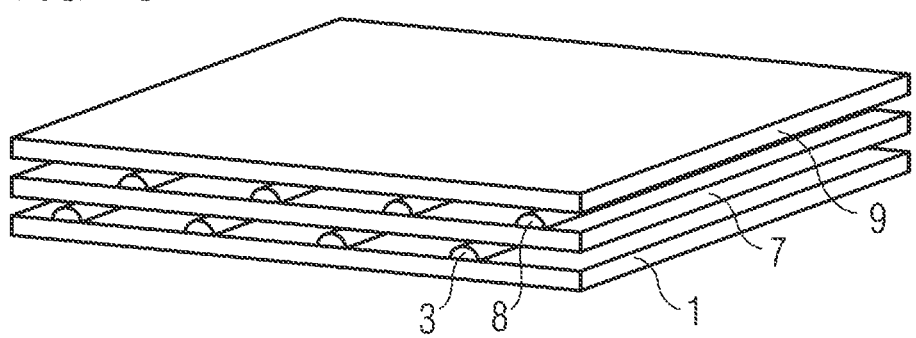
FIG. 1e shows a third layer of nonwoven applied to the beads of adhesive of FIG. 1d.
Figure 1F:
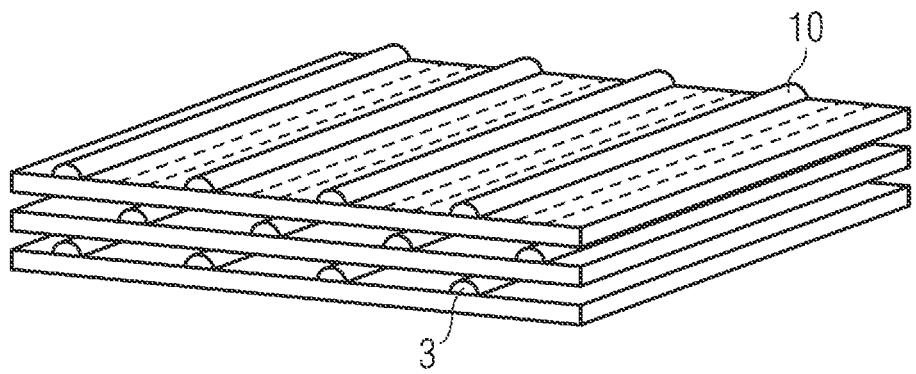
FIG. 1f shows a third application of adhesive beads on the third layer of nonwoven of FIG. 1e.

FIGS. 1a-1f show the production of a precursor from which it is possible to produce honeycomb structures of the invention made of carbon-fiber non-woven.

A first layer of carbon-fiber non-woven (1) is provided. A plurality of first, parallel-arranged beads (3) of adhesive are applied substantially with regular separations onto the upper side (2a) thereof. The underside (2b) of the first layer of carbon-fiber non-woven remains free from the said beads of adhesive. For this, the rheology of the adhesive can be adjusted in such a way that, under the application conditions, no significant quantity of adhesive penetrates through the carbon-fiber non-woven and no adhesive is present on the underside of the first layer (1). The arrangement can have carbon-fiber paper on the underside of each layer in order that, under the application conditions, no significant quantity of adhesive penetrates through the carbon-fiber non-woven and no adhesive is present on the underside of the first layer (1). Another possibility is that beads of adhesive applied take the form of thermoplastic adhesive similar to an adhesive tape so that, under the application conditions, no significant quantity of adhesive penetrates through the carbon-fiber non-woven and no adhesive is present on the underside of the first layer (1).

The separations between the beads (3) of adhesive are such that the resultant separation (4) between the individual beads (3) of adhesive is about three to nine, particularly preferably from five to seven, widths of the beads of adhesive. The parallel-arranged beads (3) of adhesive therefore cover about ¼ to 1/10, particularly preferably ⅙ to ⅛, of the upper-side area of the first layer of carbon-fiber non-woven (1). A half honeycomb can subsequently be produced by folding along the edges (5) of the beads of adhesive, and also along the broken lines (5). In the next step a second layer of carbon-fiber non-woven (7) is placed onto the said first layer (6) with beads of adhesive. A plurality of further, parallel-arranged beads (8) of adhesive are in turn applied with substantially regular separations onto the upper-side area of the uppermost layer of carbon-fiber non-woven (7), whereupon the further, parallel-arranged beads (8) of adhesive likewise cover from ¼ to 1/10, particularly preferably from ⅙ to ⅛, of the area of the further layer of carbon-fiber non-woven (7), being arranged parallel, and also centrally offset with respect to the aforementioned, between the beads (3) of adhesive located under the uppermost layer of carbon-fiber non-woven. The underside of the further layer of carbon-fiber non-woven (7) in turn remains free from the said beads of adhesive. A further layer of carbon-fiber non-woven (9) is then placed onto the material. Repetitions of the last two steps produce a stack of layers of carbon-fiber non-woven between which there are parallel layers of beads of adhesive. The positions of the beads of adhesive of alternate layers (3) and (10) here are directly above one another in the direction orthogonal to the layers of carbon-fiber non-woven.

Figure 2A:
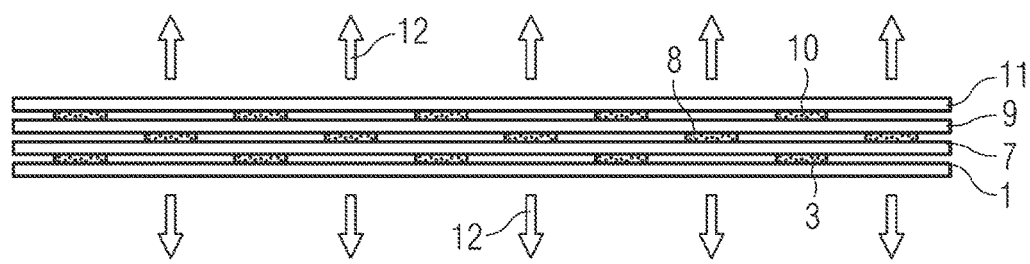
FIG. 2a shows a longitudinal section of a stack of layers of nonwoven prior to the application of tensile forces.
Figure 2B:
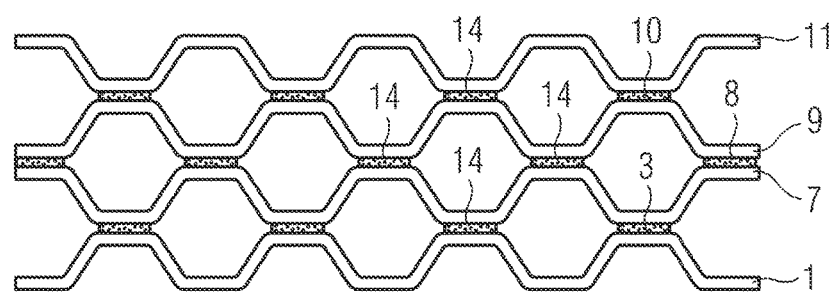
FIG. 2b shows the longitudinal section of the stack of layers after the application of tensile forces creating a hexagonal honeycomb structure.
Figure 2C:
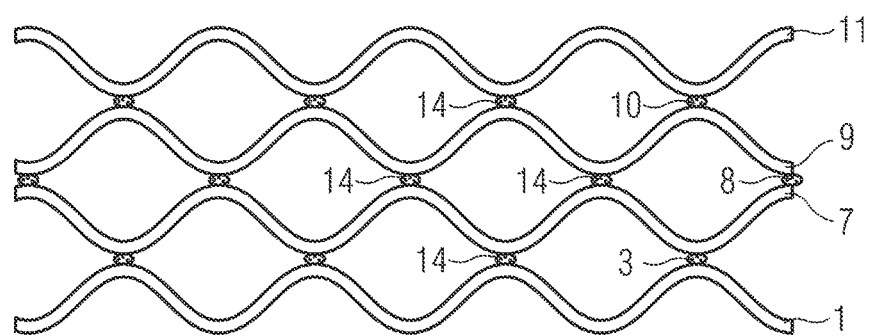
FIG. 2c shows the longitudinal section of the stack of layers after the application of tensile forces creating a honeycomb structure with rounded edges.

FIGS. 2a-2c show a detail of this arrangement in longitudinal section, where the arrangement has an outer layer (11) above the final layer of beads (10) of adhesive. After the hardening of the beads of adhesive, the arrangement can be expanded via tensile forces (12) directed so as to be orthogonal to the layers of carbon-fiber non-woven and incident on the first and the final layer of carbon-fiber non-woven, and give a honeycomb structure as depicted in FIG. 3.

Figure 3:
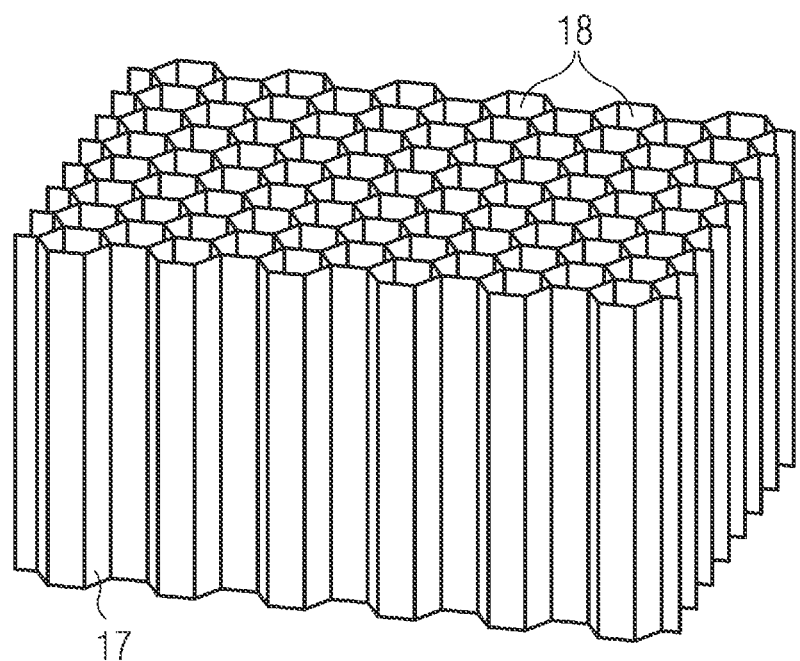
FIG. 3 shows a perspective view of the honeycomb structure of FIG. 2b.

FIG. 3 shows an expanded honeycomb structure made of the corrugated individual layers (1), (7), (9) and (11) bonded to one another by the beads of adhesive. The beads (3) of adhesive bond only some parts of the undermost layer of carbon-fiber non-woven (1) to the layer (7) situated thereabove, and specifically in such a way that a honeycomb (13) is formed from the sections located in the layers of carbon-fiber non-woven (1) and (7) between two beads (14) of adhesive. The said honeycomb can have the shape of a hexagon. To this end, at the two sections located between the beads (14) of adhesive in the layers of carbon-fiber non-woven (1) and (7) there can in each case be four sharp bends (15) which in each case form two adjacent angles of the hexagon; within a honeycomb, these pairs of angles are located opposite to one another. The remaining two angles are formed by the layers of carbon-fiber non-woven (1) and (7) held together by the beads of adhesive, and specifically in each case at the edges of the beads of adhesive.

The hexagon (13) that forms the honeycomb is thus formed.

FIG. 2c shows another embodiment of the honeycombs of the invention, with a greater degree of edge-rounding.

FIG. 3 shows an expanded honeycomb structure (17) in the form of a block, said structure having been impregnated with resin and cured. It is composed of a multiplicity of parallel honeycombs (18) of approximately equal dimensions.

Figure 4:
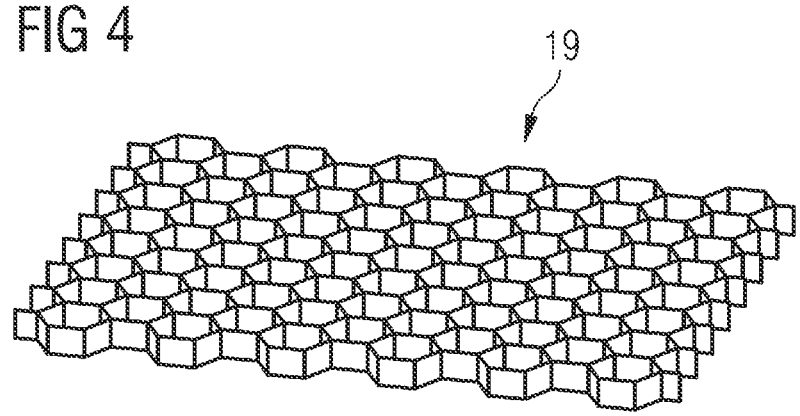
FIG. 4 shows a perspective view of a honeycomb sheet cut from the honeycomb structure of FIG. 3.

FIG. 4 shows a honeycomb sheet 19 which has been cut to size from an expanded honeycomb structure (17), for example by sawing. The cut here is made perpendicularly to the longitudinal direction of the individual tubes of the honeycomb.

Figure 5:
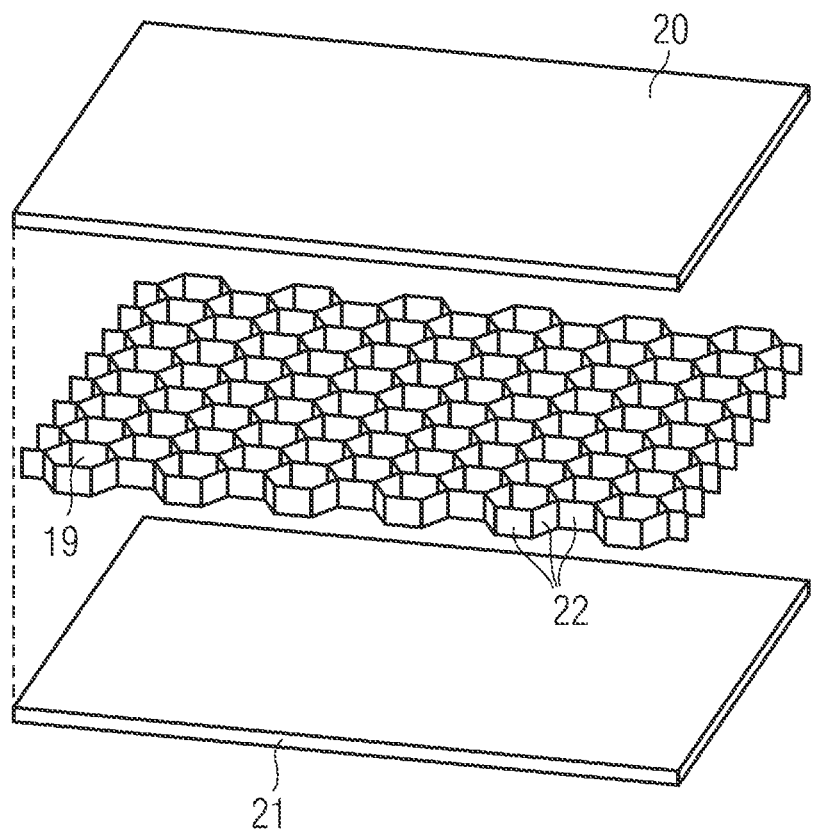
FIG. 5 shows the honeycomb sheet of FIG. 4 being assembled with two outer sheets.

FIG. 5 shows a honeycomb sheet (19), and also two outer sheets (20) and (21) which are placed upon the two sides of the honeycomb sheet (19); this arrangement has the walls (22) of the honeycombs perpendicular to the outer sheets (20) and (21). The outer sheets (20), (21) are composed of at least one of GRP, CFRP and metal.

Figure 6:
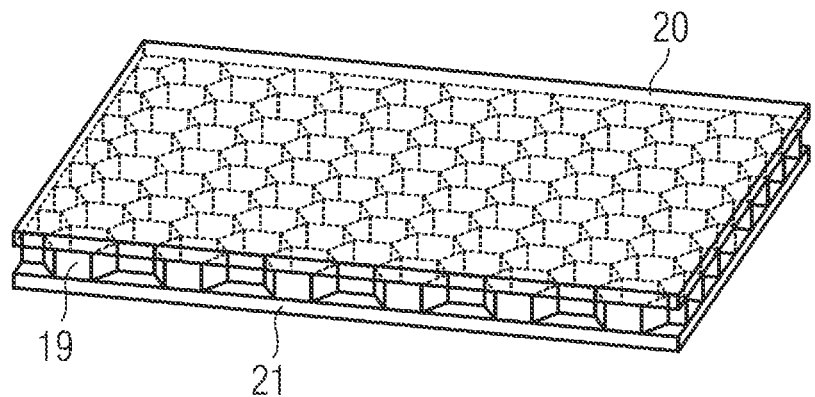
FIG. 6 shows the honeycomb sheet and outer sheets of FIG. 5 in an assembled state.

FIG. 6 shows a sandwich structure made of a honeycomb sheet (19) provided with two outer sheets (20) and (21). There is frictional bonding here between the honeycombs and the outer sheets.

Figure 7:
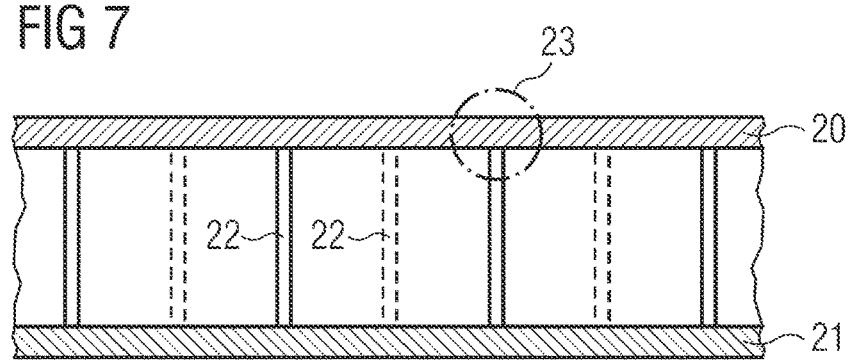
FIG. 7 shows a longitudinal partial sectional view of the structure of FIG. 6.

FIG. 7 shows a cross section through a sandwich structure made of a honeycomb sheet (19) provided with two outer sheets (20) and (21). The bond (23) bonds the walls of the honeycombs (22) to the outer sheet (29).

Figure 8:
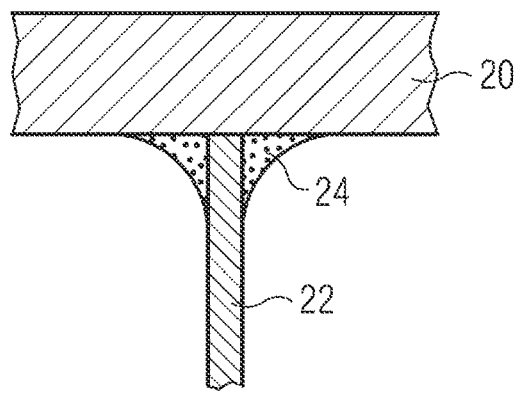
FIG. 8 shows an enlarged junction area of the structure of FIG. 7.
Figure 9A:
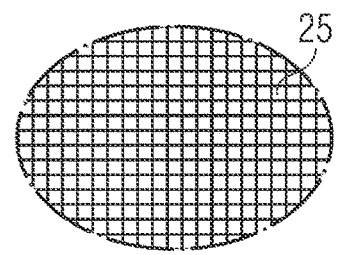
FIG. 9a shows a plan view of a 90/0° multiaxial laid scrim.
Figure 9B:
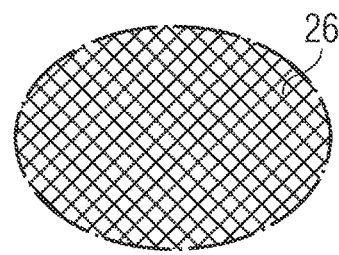
FIG. 9b shows a plan view of a 45/−45° multiaxial laid scrim.
Figure 9C:
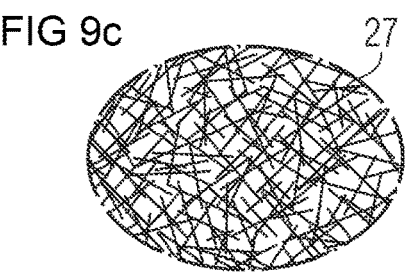
FIG. 9c shows a plan view of a carbon-fiber non-woven.
Figure 9D:
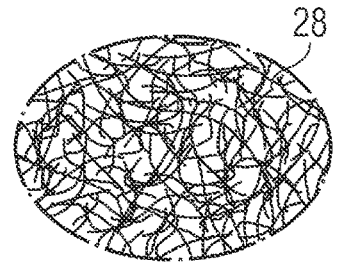
FIG. 9d shows a plan view of a carbon-fiber paper.

FIG. 8 is an enlargement of the bond (23) between the walls of the honeycombs (22) and the outer sheet (29). An adhesive (24) provides a frictional bond here between the walls of the honeycombs (22) and the outer sheet (29), giving a fillet joint.

FIGS. 9a-9d depict a 90/0° multiaxial laid scrim (25), a 45/−45° multiaxial laid scrim (26), a carbon-fiber non-woven (27), and a carbon-fiber paper (28).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS (1) First layer of carbon-fiber non-woven
(2a) Upper side of first layer of carbon-fiber non-woven
(2b) Underside of first layer of carbon-fiber non-woven
(3) Beads of adhesive
(4) Separation between individual beads of adhesive
(5) Edges of beads of adhesive
(6) First layer with beads of adhesive
(7) Second layer of carbon-fiber non-woven
(8) Further beads of adhesive
(9) Further layer of carbon-fiber non-woven

(10) Beads of adhesive of the respective alternate layer
(11) Outer layer
(12) Tensile forces
(13) Hexagonal honeycomb
(14) Beads of adhesive arranged so as to be mutually superposed
(15) One layer of carbon-fiber non-woven
(16) Sharp bends formed by two bonded layers
(17) Expanded honeycomb structure in block form
(18) Parallel honeycombs
(19) Honeycomb sheet
(20) Upper outer sheet
(21) Lower outer sheet
(22) Walls of honeycombs
(23) Bond between honeycomb and outer sheet
(24) Adhesive
(25) 90/0° multiaxial laid scrim
(26) 45/−45° multiaxial laid scrim
(27) Carbon-fiber non-woven
(28) Carbon-fiber paper

The invention claimed is:

1. A honeycomb structure comprising carbon-fiber non-woven and unidirectional fibers wherein a ratio by mass of carbon-fiber non-woven to unidirectional fibers is greater than 10:1.

2. The honeycomb structure according to claim 1, wherein the honeycomb structure is composed predominantly of carbon-fiber non-woven.

3. The honeycomb structure according to claim 1, wherein the carbon-fiber non-woven comprises reclaimed carbon fibers.

4. The honeycomb structure according to claim 1, wherein a length of the fibers of the carbon-fiber non-woven is from 6 to 50 mm.

5. The honeycomb structure according to claim 1, wherein the fibers of the carbon-fiber non-woven are predominantly unoriented.

6. The honeycomb structure according to claim 5, wherein the fibers of the carbon-fiber non-woven have a random orientation.

7. The honeycomb structure according to claim 1, wherein the honeycomb structure is impregnated with synthetic resin.

8. The honeycomb structure according to claim 1, wherein the honeycomb structure additionally comprises fire-retardant additives.

9. A sandwich structure comprising a honeycomb structure comprising carbon-fiber non-woven and unidirectional fibers wherein a ratio by mass of carbon-fiber non-woven to unidirectional fibers is greater than 10:1.

10. The sandwich structure according to claim 9 moreover comprising two substantially parallel-arranged outer layers, between which the honeycomb structure is arranged, wherein the walls of the honeycomb structure are arranged so as to be substantially orthogonal to the outer layers.

11. The sandwich structure according to claim 9, wherein the outer layers are composed of at least one of GRP, CFRP and metal.

* * * * *